US007149504B1

(12) United States Patent
Weaver et al.

(10) Patent No.: US 7,149,504 B1
(45) Date of Patent: Dec. 12, 2006

(54) METHOD AND SYSTEM FOR MANAGING LOCATION POLLING INTERVALS

(75) Inventors: Farni Weaver, Spring Hill, KS (US); Piyush Jethwa, Overland Park, KS (US); Jesse Grindeland, Olathe, KS (US); Scott Wilson, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 218 days.

(21) Appl. No.: 10/670,872

(22) Filed: Sep. 25, 2003

(51) Int. Cl.
*H04M 3/42* (2006.01)
(52) U.S. Cl. .............................. 455/414.2; 455/414.3; 455/421; 455/456.1; 455/456.3
(58) Field of Classification Search ............ 455/404.2, 455/456.1, 456.3, 457, 466, 9, 414.1–414.3, 455/432.3, 412.1, 422.1
See application file for complete search history.

(56) References Cited

U.S. PATENT DOCUMENTS

| 5,790,974 A * | 8/1998 | Tognazzini ............... 455/456.5 |
| 6,078,826 A * | 6/2000 | Croft et al. ................ 455/574 |
| 6,091,956 A * | 7/2000 | Hollenberg ............... 455/456.5 |
| 6,625,457 B1 * | 9/2003 | Raith ....................... 455/456.1 |
| 6,745,125 B1 * | 6/2004 | Saraga et al. ............... 701/207 |
| 6,847,892 B1 * | 1/2005 | Zhou et al. ................. 701/213 |
| 2002/0111154 A1 * | 8/2002 | Eldering et al. ............ 455/414 |
| 2004/0137886 A1 * | 7/2004 | Ross et al. ............... 455/414.1 |
| 2004/0219932 A1 * | 11/2004 | Verteuil ................... 455/456.2 |
| 2004/0248546 A1 * | 12/2004 | Bhaumick ................ 455/404.2 |
| 2004/0259546 A1 * | 12/2004 | Balachandran et al. .. 455/435.2 |
| 2004/0267440 A1 * | 12/2004 | DeKock et al. ............. 701/117 |
| 2005/0075119 A1 * | 4/2005 | Sheha et al. ............. 455/456.6 |
| 2005/0101333 A1 * | 5/2005 | Raith ....................... 455/456.1 |

\* cited by examiner

*Primary Examiner*—Duc Nguyen
*Assistant Examiner*—Dai Phuong (57) ABSTRACT

A method and system for managing location polling intervals is provided. A location determining element will determine a mobile station's current location and will compare the current location to a designated location. Based on the comparison between the current location and the designated location, the location determining element will compute a next time to determine the mobile station's current location. This process will repeat until the mobile station is located at or within a range of the designated location. Once the mobile station is located at or within the range of the designated location, the location determining element will notify a content server, which will provide specific content to the mobile station.

15 Claims, 4 Drawing Sheets

METHOD AND SYSTEM FOR MANAGING LOCATION POLLING INTERVALS

FIELD OF INVENTION

The present invention relates to wireless communications, and more particularly, to a mechanism for controlling an interval at which a network polls for a location of a mobile station.

BACKGROUND

Wireless telecommunication networks are increasingly using wireless location technologies to determine the locations of mobile stations they serve. As a result, there is an increasing interest in developing location-based services and applications, i.e., applications that make use of mobile station location information. These location-based applications may simply track or monitor the locations of mobile stations, or they may provide information or services to mobile stations based on their locations. Such location-based applications may be internal to the wireless telecommunication network, or they may be third-party applications that obtain the locations of mobile stations from a location server or other entity in the wireless telecommunication network. The Location Inter-operability Forum (LIF) has developed the "Mobile Location Protocol Specification" (version 3.0.0 published on Jun. 6, 2002), which defines one access method that allows applications to obtain mobile station location information from a wireless network.

In the existing art, in order to determine that a mobile station is positioned at a designated location, an entity of a wireless network will periodically determine the mobile station's location, until the mobile station's location matches the designated location. For example, the wireless network may poll a mobile station every ten minutes to determine if the mobile station is located at designated locations. The process of periodically determining a mobile station's location, however, can be inefficient, particularly if the mobile station is currently located far away from the designated location. Moreover, periodically polling to determine the mobile station's location exhausts network resources, considering that the network may perform the polling function for many mobile stations at once.

SUMMARY

According to the exemplary embodiment, a method for managing location polling intervals is provided. The method includes determining a current location of a mobile station and making a comparison of the current location to a designated location. The method further includes, based on the comparison, computing a next time to determine an updated location of the mobile station.

As one application of the exemplary embodiment, an application residing within a network entity may need to know when a mobile station arrives at or near a particular location. According to the exemplary embodiment, a location determining element can poll the mobile station once to determine its current location, and then receive an estimation of a travel time for the mobile station to travel from the current location to the particular location. The estimated travel time may be the fastest time (in minutes) that it would take the mobile station to arrive at the particular location, for example. The location determining element can then poll the mobile station again once the estimated time period has expired (or before the estimated time period has expired) to determine an updated location of the mobile station. This method of polling the mobile station prevents a network from polling users every 2 minutes (or at some pre-set configuration) unnecessarily and may help reduce use of network resources.

In another respect, the exemplary embodiment may take the form of a method that includes determining when a mobile station is located within a range of a designated location by: (i) determining a current location of the mobile station, (ii) if the current location is not within the range, computing a next time to determine an updated location of the mobile station, and at the next time, repeating from step (i). The method further includes responsively providing the mobile station with content that is associated with the designated location when the mobile station is located within the range of the designated location.

In still another respect, the exemplary embodiment may take the form of a system that includes a content serving element and a location determining element. The content serving element stores content associated with a designated location and sends the content to a mobile station when the mobile station is located within a range of the designated location. The location determining element is arranged to determine when the mobile station is located within the range and to responsively inform the content server when the mobile station is within the range. The location determining element determines when the mobile station is located within the range by performing a process that includes (i) determining a current location of the mobile station, (ii) if the current location is not within the range, computing a next time to determine an updated location of the mobile station, and at the next time, repeating from step (i).

These as well as other features, advantages and alternatives will become apparent to those of ordinary skill in the art by reading the following detailed description, with appropriate reference to the accompanying drawings.

BRIEF DESCRIPTION OF FIGURES

Exemplary embodiments of the present invention are described with reference to the following drawings, in which.

DETAILED DESCRIPTION OF EXEMPLARY EMBODIMENTS

The present invention provides a mechanism for controlling the interval at which a network polls for the location of a mobile station. The invention is particularly useful in a scenario where an effort is being made to determine that a mobile station is positioned at a particular location (rather than to just determine where a mobile station is currently located). An example of such a scenario is where an application server will send an e-coupon to a mobile station when the mobile station is located in front of a particular store.

In accordance with an exemplary embodiment of the invention, a carrier or other entity will determine the mobile station's current location and will compare the location to a designated location. Based on the comparison between the current location and the designated location, the carrier or other entity will compute a next time to determine the mobile station's current location. This process will repeat until the mobile station is located at the designated location, or close enough to the designated location.

For instance, given an indication of the mobile station's current location and the designated location, the carrier can query MapPoint® or another geoserver (using a standard application programming interface (API), such as Open Location Services (OpenLS), for instance) to determine how long it might take for the mobile station to travel from the current location to the designated location. The travel time could be a drive time or a walk time, for instance, which the geoserver could determine by reference to traffic, route and mapping databases, possibly taking into consideration a current velocity of the mobile station, if known. In the exemplary embodiment, the most conservative value would be a fast drive time from the current location to the designated location.

In turn, the carrier may compute a predetermined percentage, such as 75%, of the travel time and can then plan to determine the mobile station's location again once that predetermined percentage of the travel time expires. This way, the carrier will poll the mobile station's location more often as the mobile station gets closer to the designated location. Further, the carrier could programmatically stop polling the mobile station's location once a determination is made that the remaining travel time is less than a predetermined floor.

Wireless Network Architecture

Figure 1:
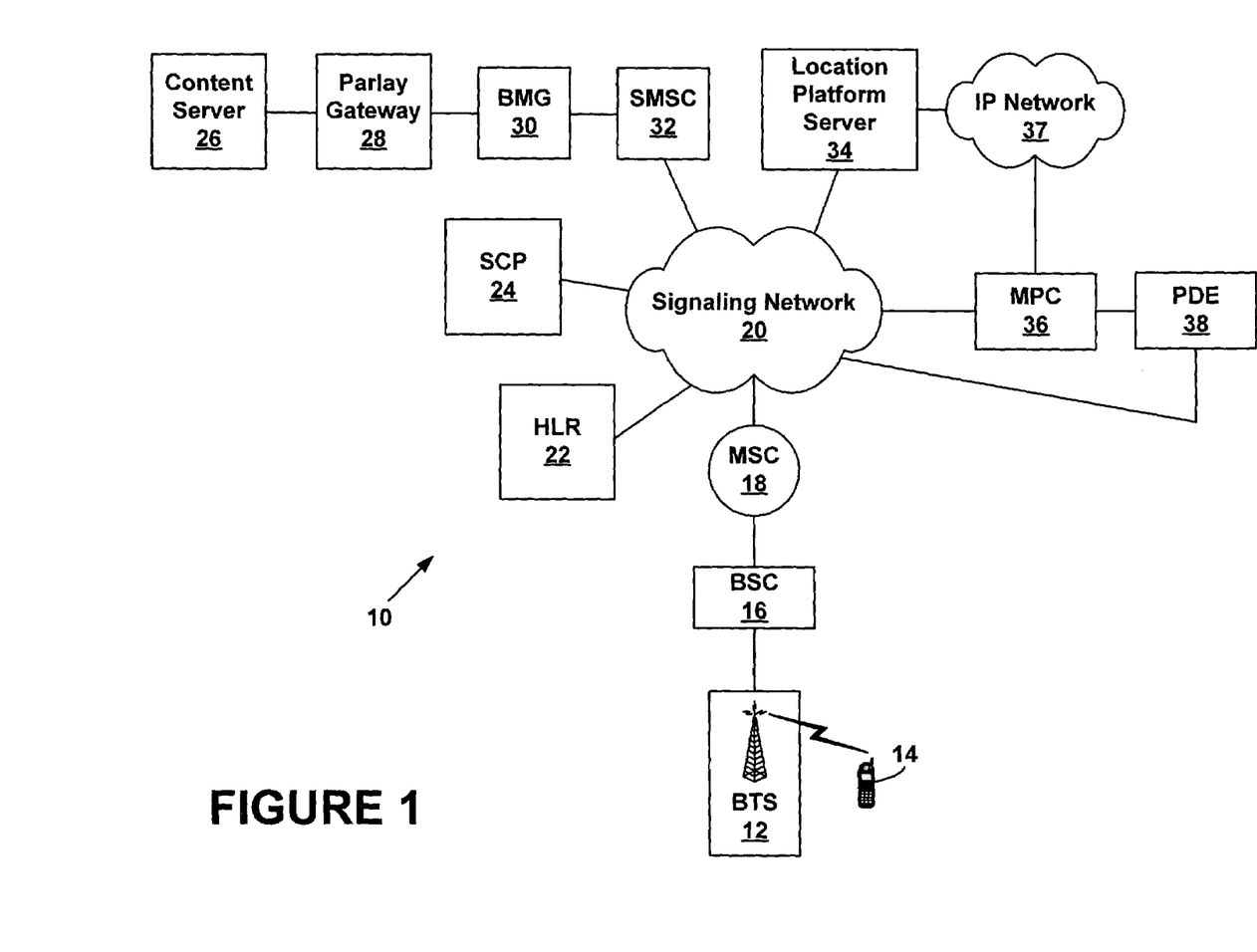
FIG. 1 is a block diagram illustrating one embodiment of a wireless communication network.

Referring now to the figures, FIG. 1 is a block diagram illustrating one embodiment of a wireless communication network 10. It should be understood that this and other arrangements described herein are set forth for purposes of example only, and other arrangements and elements can be used instead and some elements may be omitted altogether. Further, many of the elements described herein are functional entities that may be implemented as hardware, firmware or software, and as discrete components or in conjunction with other components, in any suitable combination and location.

The network 10 includes a base transceiver station (BTS) 12 that provides a wireless coverage area within which the BTS 12 may communicate with one or more mobile stations, such as mobile station 14, over an air interface. Mobile station 14 may be a wireless telephone, a wirelessly-equipped personal digital assistant (PDA), or other wireless communication device. The communications between the BTS 12 and the mobile station 14 may occur in a digital format, such as code division multiple access (CDMA), time division multiple access (TDMA), global standard for mobile communications (GSM), or 802.11x, or they may occur in an analog format, such as advanced mobile phone system (AMPS). One exemplary wireless communications format is "CDMA 2000," such as described in EIA/TIA/IS-2000 Series, Rev. A (published March 2000), which is fully incorporated herein by reference.

The BTS 12 is controlled by a base station controller (BSC) 16, which, in turn, communicates with a mobile switching center (MSC) 18. The BSC 16 may be responsible for controlling power levels and frequency allocation for the air interface between the BTS 12 and the mobile station 14.

The MSC 18 is connected to a signaling network 20, which may be associated with a circuit switched network, such as a public switched telephone network (PSTN) (not shown), and the MSC 18 can then use an out-of-band signaling system, such as Signaling System 7 (SS7) in the signaling network 20 to route calls through the circuit switched network. The signaling network 20 may also be a packet switched network or it could take other forms.

The MSC 18 is able to signal through the signaling network 20 to a home location register (HLR) 22, which defines services and features authorized for use by particular mobile subscribers, and to an SCP 24. The signaling between the MSC 18 and the HLR 22 may conform to ANSI-41 specification, published by the Telecommunication Industry Association, which is fully incorporated herein by reference. The signaling between the MSC 18 and the SCP 24 may conform to the specification "Wireless Intelligent Network," TIA/EIA/IS-771, published in July 1999, which is fully incorporated herein by reference. However, other signaling protocols could be used.

The MSC 18, BSC 16 and BTS 12 may connect calls that originate from calling parties using landline telephones, mobile stations, or other communication devices, to the mobile station 14. Similarly, the MSC 18, BSC 16, and BTS 12 may connect calls originating from the mobile station 14 to their destinations.

The MSC 18 is programmed with a set of service logic that causes the MSC 18 to query the SCP 24 at predefined "trigger points" during call processing (as described in IS-771), providing the SCP 24 with parameters such as an identification of the calling and called parties, for example. When the SCP 24 receives the query message, the SCP 24 may execute an appropriate set of service logic or consult appropriate databases to obtain information and instructions needed to provide a special service to the call. In turn, the SCP 24 may return a response message to the MSC 18, instructing the MSC 18 how to handle the call.

The wireless communication network 10 also includes a content serving element, such as a content server 26. The content server 26 may be any content serving element that stores content associated with a designated location and provides the content to the mobile station 14 when the mobile station 14 is located within a range of the designated location. The content may be any type of data, such as for instance, advertisements, solicitations, or e-coupons. For example, the content may be an advertisement that is associated with the location of a particular store. Once, the mobile station is within a range of the store, such as within a ten-minute travel time, or within a few miles of the store, the content server 26 may provide the advertisement to the mobile station 14. Although the content server 26 is illustrated as a separate entity, the content server 26 may reside within any network element, such as the SCP 24, for example.

The content server 26 couples to a gateway, such as a parlay gateway 28. The parlay gateway 28 provides a standard API that may translate messages sent from the content server 26 into a protocol understood by the mobile station 14. For example, Common Object Request Broker Architecture (CORBA) may be used as a protocol between the content server 26 and the parlay gateway 28. However, other protocols may be used. The API may be an IpUI interface, as defined in the "Application Programming Interface (API) Part 5: User Interaction Service Control Feature (UISCF)," published by the European Telecommunications Standard Institute (ETSI) Parlay Group, V0.0.4 2003, which is fully incorporated herein by reference. The API provides functions to send information to, or gather information from the mobile station 14. For example, the IpUI interface allows the content server 26 to send short message service (SMS) messages, as defined by industry standard IS-637A (promulgated by the Telecommunications Industry Association (TIA)/Electronics Industry Association (EIA)).

The content server 26 therefore may send an SMS message to the mobile station 14 through the parlay gateway 28, which forwards the message to a bulk message gateway (BMG) 30. In turn, the BMG 30 sends the message to a short message service center (SMSC) 32. By querying the HLR 22, the SMSC 32 will then determine which MSC is currently serving the mobile station 14 and then forward the SMS message through the signaling network 20 to that MSC, e.g., MSC 18. The MSC 18 will then send the SMS message via the BSC 16 and the BTS 12 to the mobile station 14. The mobile station 14 will then alert a user of the new message and may display the message as text to the user.

The content server 26 may also send messages to the mobile station 14 using other signaling mechanisms as well, such as the well-known wireless application protocol (WAP) push signaling mechanism. Other examples are possible as well.

The signaling network 20 may also carry communications related to determining and reporting locations of mobile stations, such as mobile station 14. In this regard, the wireless communication network 10 may include a location determination system. The location determination system may include a location platform server 34, or any location determining element, communicatively coupled to the signaling network 20. The location determining element may be any element that resides within network 10. Also, in one instance, the location determining element may be the mobile station 14. The location determining element may manage the process of obtaining and reporting mobile station location information. The location determining element may include a processor and data storage including stored instructions that may be executed by the processor to determine a location of the mobile station, and in turn to determine when the mobile station is within a range of a designated location, for example (described more fully below).

In one instance, the location platform server 34 may direct the MSC 18 to signal the mobile station 14 according to the specification "Position Determination Service Standard for Dual Mode Spread Spectrum Systems," TIA/EIA/IS-801, published in October 1999 and fully incorporated herein by reference. This specification defines a set of signaling messages between the mobile station and the BTS/BSC/MSC to provide a position determination service in order to determine the location of the mobile station (described more fully below).

The signaling network 20 also couples to an MPC 36, which is communicatively coupled to the location platform server 34 through an IP connection, such as through an IP network 37. The MPC 36 also couples to a position determining entity (PDE) 38. The MPC 36 may be a database application operable to store and/or report locations of mobile stations. The MPC 36 may obtain and store "location tags" received from the PDE 38. A location tag may be a digital bit string that contains location information corresponding to the location of a mobile station. The location information may correspond to longitude and latitude coordinates (geocode), cell and sector information, and/or any other data representation of the location of the mobile subscriber terminal.

Multiple PDEs may serve an MPC. Therefore, the MPC 36 selects a PDE, such as PDE 38, to determine the position of a mobile station. The PDE 38 may reside within many entities, which couple to the MPC 36. Thus, PDE 38 may communicate with mobile stations, such as the mobile station 14, to determine the locations of the mobile stations and to convey this information to the MPC 36 and to the MSC 18 through the signaling network 20. The mobile station itself may also function as a PDE and communicate with MPC 36 to convey its location.

To determine the location of a mobile station, the PDE 38 may receive position information from the mobile station. (If the mobile station 14 is functioning as the PDE 38, then the PDE 38 will know the position information.) The mobile station may use a terrestrial positioning system, a celestial positioning system, or a combination of these systems to determine its position. Terrestrial positioning systems utilize various techniques, such as forward link trilaterization (FLT), advanced forward link trilaterization (AFLT), amplitude difference, angle of arrival (AD-AOA), and enhanced observed time difference (EOTD). Global Positioning System (GPS) is an example of a celestial positioning system. The PDE 38 may then process the position information, which may include analyzing pseudo ranges obtained from the mobile station. The PDE 38 may then transmit a location tag containing the location information corresponding to the location of the mobile station to the MPC 36. The PDE 38 may determine the location of the mobile station when the mobile station is engaged in a call, in data mode, and/or in idle mode.

In one embodiment, the PDE 38 determines the mobile station's location by acquiring a GPS reading of the mobile station's current location, which can include an indication of altitude, latitude, and longitude. In this regard, the mobile station 14 may include a GPS receiver, and may autonomously determine its location. The mobile station 14 may simply send to the PDE 38 or other network element its calculated location, e.g., its latitude, longitude and possibly altitude coordinates. The mobile station 14 may relay this information to the PDE 38 either upon initiation of a call, termination of a call, or periodically to update the PDE's knowledge of the location of the mobile station 14. In addition, the mobile station 14 may relay this information to the PDE 38 in response to a specific request for this information. For example, as explained above, the MPC 36 may signal the mobile station 14 requesting the mobile station's location and the mobile station 14 may respond by sending a position determination response message to the MSC 18, which relays this information to the PDE 38.

In another embodiment, "wireless assisted GPS" is used to determine the location of the mobile station 14. In the wireless assisted GPS approach, the mobile station 14 includes a GPS receiver but does not determine its location on its own. Instead, the MPC 36 or PDE 38, determines the location of mobile station 14, in terms of latitude, longitude and altitude, based at least in part on information provided by the mobile station 14. For example, the mobile station 14 may first send its approximate location, such as the cell/sector of a BTS it is operating in, to the PDE 38. Using this approximate location, the PDE 38 determines what GPS satellites are in view of the cell/sector and their Doppler offsets and then sends this information to the mobile station 14 as "assistance data." The mobile station 14 then uses this assistance data to acquire GPS signals from the GPS satellites and, thereby, obtains information, such as pseudo ranges, from which its location may be calculated. The mobile station 14 then sends the pseudo ranges and/or other location-related information to the PDE 38. The PDE 38 then calculates the location of the mobile station 14, such as in terms of latitude, longitude and altitude, based on the information from the mobile station 14 and, optionally, various corrections.

In still another example, the mobile station 14 may autonomously determine its location in response to a request to determine its location from an application that resides within the mobile station 14, by either using a GPS receiver or by sending a position determination request message into the network and receiving a position information response from the network.

However, other techniques for determining the location of the mobile station 14 may be used. For example, location technologies that do not rely on GPS may be used to determine the location of the mobile station 14, such as by performing a time/frequency analysis on incoming signals received at the BTS 12.

Signaling between the MPC 36 and PDE 38, and between the MPC 36 and the MSC 18 to determine mobile station location information, may conform to the TIA/EIA/J-STD-036 (Telecommunications Industry Association/Electronics Industry Alliance), entitled "Enhanced Wireless 911, Phase 2," published in August 2000, and revised in March 2002, and which is fully incorporated herein by reference.

As one example outlined in J-STD-036, the Location Services Protocol (LSP) may be used for signaling between the MPC 36 and PDE 38 and is applicable to AMPS, TDMA and CDMA air interfaces. A GeoPositionRequest (GPOSREQ) message may be sent by the MPC 36 to the PDE 38 to request the PDE 38 for an initial, updated or last known position of a mobile station. Position information may then be sent from the PDE 38 to the MPC 36 using a GeoPositionDirective (GPOSDIR) message. Further, a Short Message Delivery Point To Point (SMDPP) message can be used to transfer position information between the MPC 36 and the MSC 18.

Figure 2:
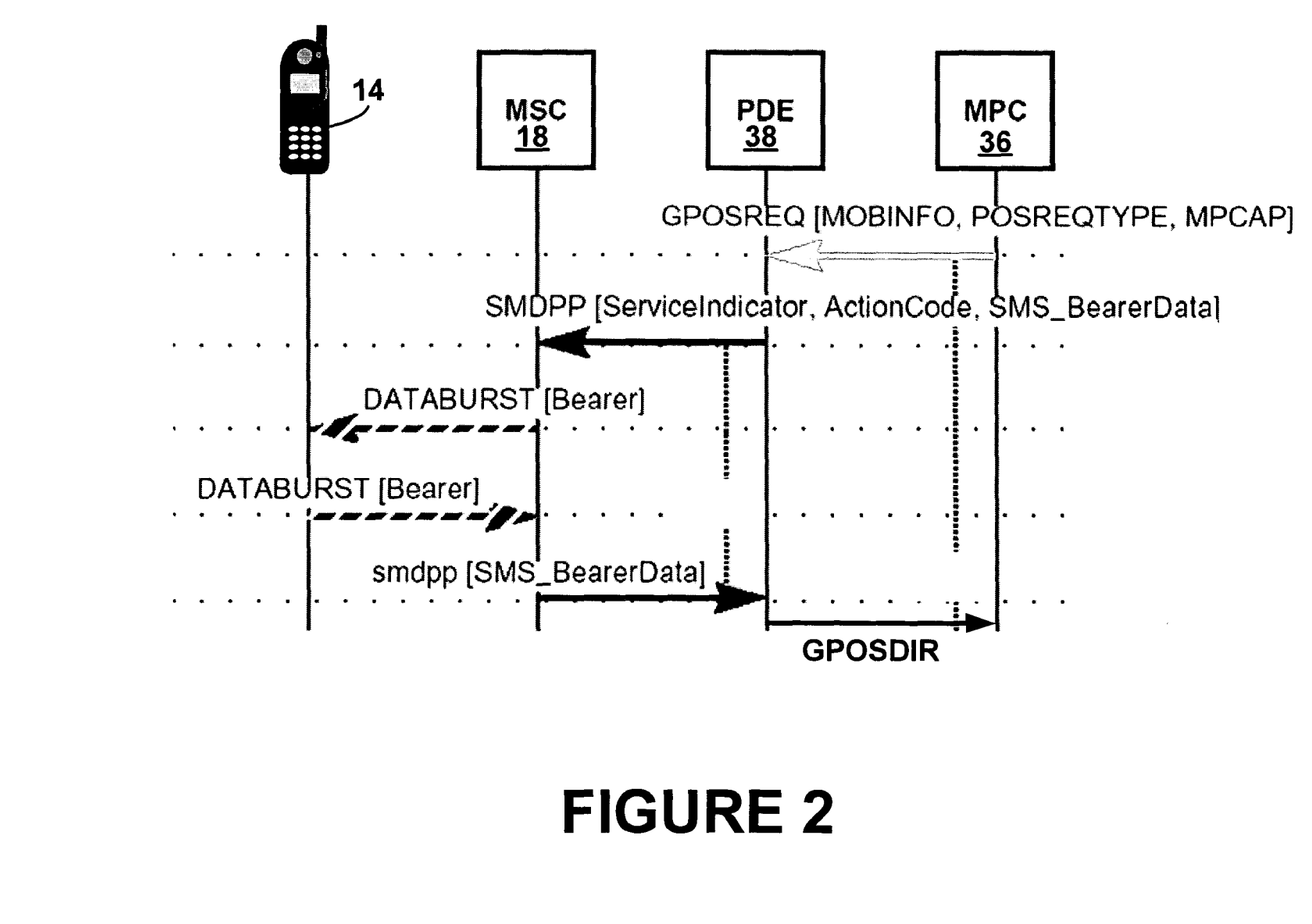
FIG. 2 is a message flow diagram illustrating one example of signaling within the wireless communication network to determine position information.

FIG. 2 illustrates one specific example of signaling within the network 10 to determine position information. When the MPC 36 requests position information from the PDE 38, the MPC 36 will send a position request message to the PDE 38, which indicates the mobile station's position capabilities. The position request message may be a GPOSREQ message, for example. The GPOSREQ may include mobile information (MobInfo) like a mobile identification number (MIN) of the mobile station 14, POSREQTYPE (request type), and an MPCAP parameter (mobile station position capability).

The PDE 38 then initiates an SMDPP message to the MSC 18 to request the mobile station's position. The SMDPP may contain parameters such as a ServiceIndicator (to indicate the type of service requested such as a position determination service), an ActionCode (to specify the nature of the action to be performed by the PDE), an SMS_BearerData (e.g., including information pertaining to the mobile station), and others. The PDE 38 encapsulates in the SMS_BearerData parameter an action according to the value of the MPCAP parameter and the procedures defined in IS-801. The ServiceIndicator parameter may identify this as handset assisted position information. The MSC 18 will receive the SMDPP message and send a databurst message according to TIA/EIA/IS-801 to the mobile station 14 containing the bearer data from the SMDPP message including the positioning related information. The mobile station returns a response containing the positioning related information (e.g., IS-801 information) in a databurst message to the MSC 18. The MSC 18 sends the mobile station-provided positioning related information in an SMDPP response message to the PDE 38. The PDE 38 uses the received information to determine the mobile station's position and sends a response to the MPC 36 (e.g., a GPOSDIR response message).

Controlling Polling Interval

Figure 3:
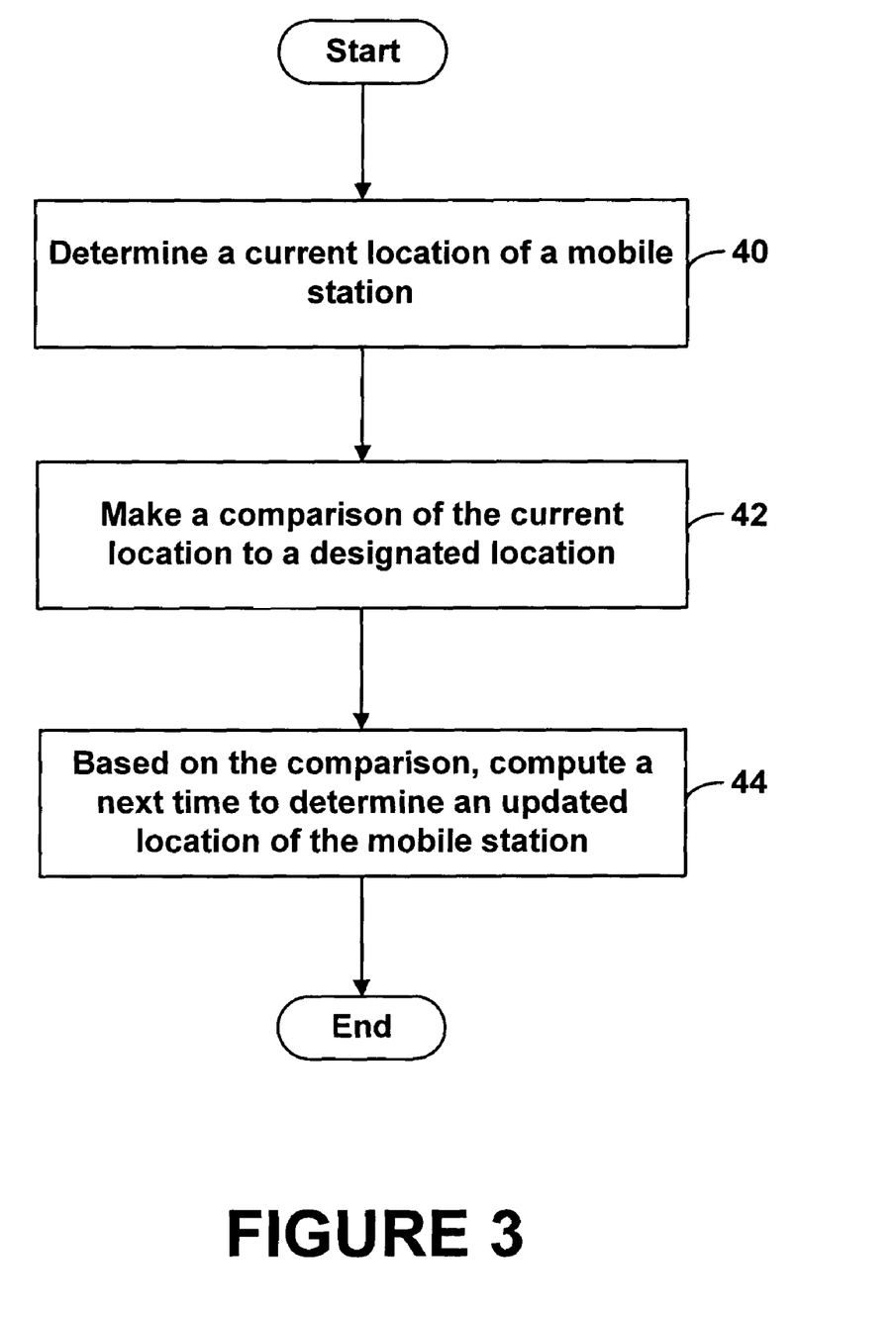
FIG. 3 is a flowchart depicting functional blocks of a method for managing mobile station location polling intervals according to one embodiment.

FIG. 3 is a flowchart depicting functional blocks of an exemplary embodiment of the invention. In accordance with the exemplary embodiment of the invention, a carrier or other entity of a wireless network will determine a mobile station's current location, as shown at block 40, and make a comparison of the current location to a designated location, as shown at block 42. Based on the comparison between the current location and the designated location, the carrier or other entity will compute a next time to determine an updated location of the mobile station, as shown at block 44. This process may repeat until the mobile station is located at the designated location, or close enough (such as within 10 minutes) to the designated location.

In the exemplary embodiment, the location platform server 34 may use the method as depicted in FIG. 3 to determine when a mobile station is located within a range of a designated location, and then responsively direct the content server 26 to send content that is associated with the designated location to the mobile station when the mobile station is located within the range. For example, the location platform server 34 may determine when a mobile station is within an approximate travel time to a specific location, such as a store, and then when the mobile station is within that travel time, the location platform server 34 will then inform the content server 26 (e.g., possibly through a packet-switched network using any number of Internet Protocols such as Remote Method Invocation (RMI), CORBA, Hyper Text Transfer Protocol (HTTP), and Session Initiation Protocol (SIP)). The content server 26 will then send content associated with the specific location to the mobile station. For example, the content server 26 could send an advertisement for a specific store to the mobile station once the mobile station is within five minutes, or any predefined range of travel time, from the store. The designated or specific location that the location platform server 34 monitors, in relation to the location of the mobile station, can be any desired location. Exemplary locations may be locations associated with specific stores or restaurants.

However, in an alternate embodiment, the mobile station 14 (rather than or in addition to a network platform server) may use the method as depicted in FIG. 3 to determine when the mobile station 14 is located within a range of a designated location, such as a user-defined location. The mobile station 14 may send a position determination request (such as an IS-801 message) into the network 10 and receive an indication of the current location of the mobile station 14 from the network 10. As one example, the mobile station 14 may determine when the mobile station 14 is within five minutes of a store using the method of FIG. 3, and at that time responsively activate on the mobile station 14 a web browser with a web page of the store. Other examples are possible as well.

Figure 4:
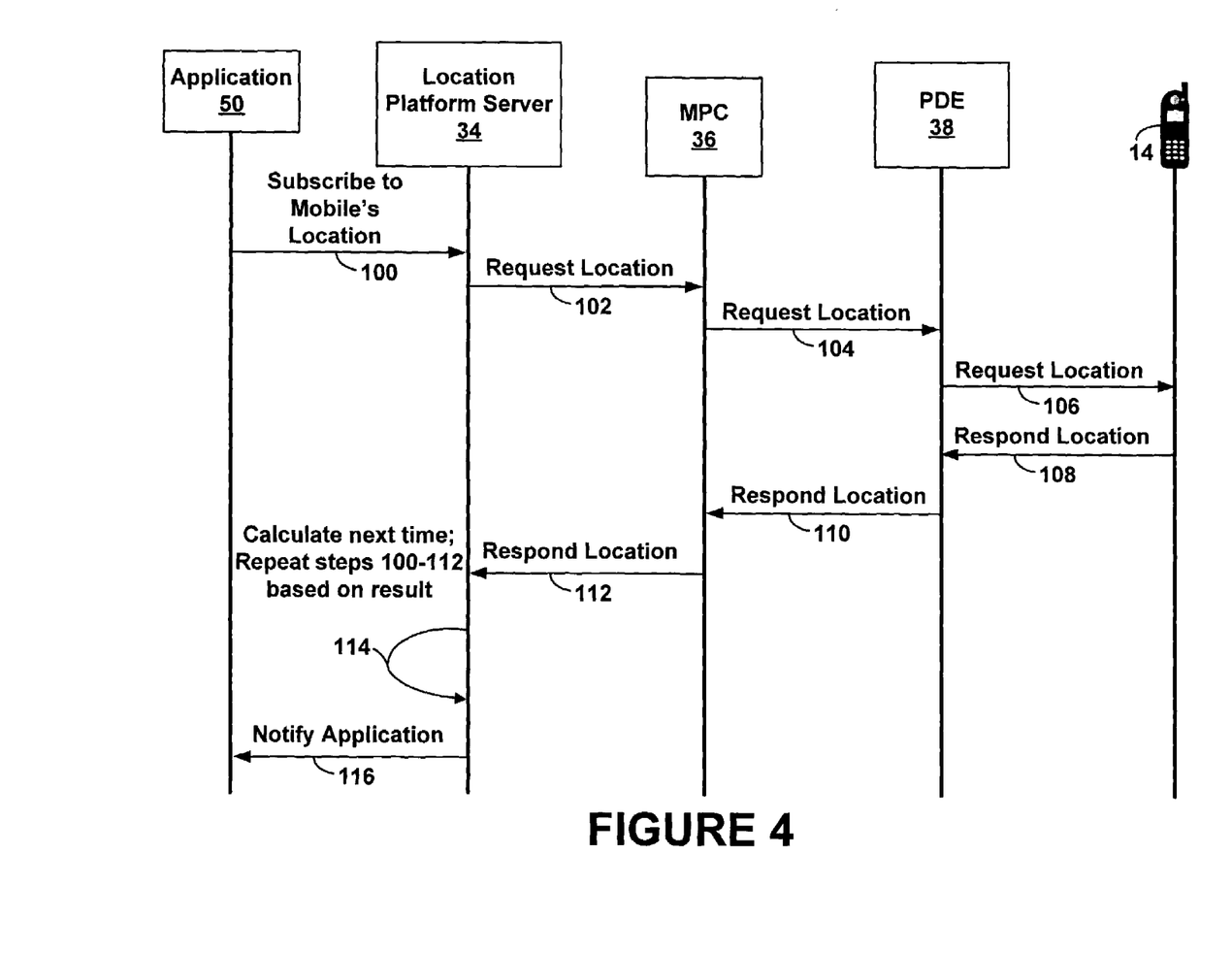
FIG. 4 is a message flow diagram illustrating one example of signaling within the wireless communication network to control a polling interval to determine a location of a mobile station.

FIG. 4 is a message flow diagram illustrating one example of signaling within the wireless communication network 10 to control a location determining polling interval, in order to determine when the mobile station is at or near a designated location. Initially, an application 50 will request the location of the mobile station 14 from the location platform sever 34, as shown by message 100. The application 50 may reside within many different entities of the network 10. For example, the application 50 may reside within the content server 26, within the mobile station 14, or within the location platform server 34. The application 50 may manage the polling process that is used to determine when the mobile station 14 is located within a given range of the desired location. The application 50 requests the location of the user of the mobile station 14 by contacting the location platform server 34. For example, if the application 50 resides within the content server 26, the application 50 will send a message through the signaling network 20 to the location platform server 34.

By requesting or subscribing to the location of the mobile station 14, the application 50 asks the location platform server 34 to inform the application 50 when the mobile station 14 is at or near a designated location. The application 50 may ask the location platform server 34 to inform the application 50 when the mobile station 14 is at a specific designated location and/or a distance within a designated location. The location platform server 34 will then continue to determine the location of the mobile station 14 until the mobile station 14 is at or near the designated location. The location platform server 34 can then respond to the application 50 once the mobile station 14 is at or near the designated location.

In one embodiment, the application 50 may request the location of the mobile station 14 from the location platform server 34 through a Parlay gateway (not shown in FIG. 4). The Parlay gateway may translate the application's request for the location of the mobile station 14 into a protocol understood by the location platform server 34. Additionally, the Parlay gateway may translate the location information obtained from the location platform server 34 into a protocol understood by the application 50. For example, CORBA may be used as a protocol between the application 50 and the Parlay gateway. Additionally, Location Interoperability Forum (LIF) Mobile Location Protocol (MLP) 3.0.0 may be used as a protocol between the Parlay gateway and the location platform server 34. However, other protocols may be used.

The location platform server 34 will request the location of the mobile station 14 by contacting the MPC 36, as shown by message 102. In turn, the MPC 36 will contact the PDE 38, as shown by message 104, and the PDE 38 then requests the location of the mobile station 14 from the mobile station 14, as shown by message 106.

The mobile station 14 will respond by sending location information to the PDE 38, as shown by message 108, and the PDE 38 will forward this information to the MPC 36, as shown by message 110. The MPC 36 then forwards this information to the location platform server 34, as shown by message 112. The location platform server 34 will then calculate a next time to poll the MPC 36 to determine an updated location of the mobile station 14, and at the next time, the location platform server 34 signals the MPC 36, as shown by message 114. The location platform server 34 calculates the next time in part by considering a comparison between the current location of the mobile station 14 and the designated location.

Once the location platform server 34 determines that the mobile station 14 is at (or close enough to) the designated location, the location platform server 34 will stop polling the MPC 36, and then notify the application 50, as shown by message 116. The location platform server 34 can notify the application 50 once the mobile station 14 is at or near the designated location using a callback function. For example, the location platform server 34 could perform a callback to the application 50 using any protocol such as RMI, CORBA, HTTP or SIP. As one specific example, the location platform server 34 may send a callback message to the application 50 when the mobile station 14 is at or near the designated location, i.e., when the event is triggered. This may be accomplished using the gateway 28 that resides between the application 50 (assuming in this example that the application 50 resides in the content server 26) and the location platform server 34.

Once the application 50 is notified that the mobile station 14 is at or near the designated location, the application may then cause the content server 26 to send content that is associated with the designated location via the SMSC 32 through the signaling network 20 to the mobile station 14, for example.

Making a Comparison of the Current Location to the Designated Location

After receiving the current location of the mobile station 14, the location determining element, e.g., location platform server 34, then compares the current location to the location designated by the application 50. The location platform server 34 will make a comparison in part by estimating a time interval for the mobile station 14 to travel from the current location to the designated location. In one example, the location platform server 34 will request the estimated time interval from a geoserver, and the geoserver will respond by sending the estimated time interval to the location platform server 34. The location platform server 34 may query the geoserver using a standard API for instance, to determine how long it might take the mobile station 14 to travel from the current location to the designated location. The location platform 34 will send the current location and the designated location to the geoserver, which may then calculate an estimated time for the mobile station 14 to travel to the designated location. The travel time could be a drive time or a walk time, for instance, which the geoserver could determine by reference to traffic, route and mapping databases, possibly taking into consideration a current velocity of the mobile station, if known.

The geoserver server may be MapPoint® or another server residing within the signaling network 20. The geoserver may include any number of mapping databases for determining a travel route between two locations. The geoserver may then determine a travel time for the route using known speed limits of roads within the travel route, for example. To determine a conservative travel time, such that the mobile station will not pass the designated location before the next polling, a fast drive time could be used to compute the travel time, such as 65 miles per hour (or any desired driving speed).

The location platform server 34 will receive the estimated travel time from the geoserver and will then determine if the mobile station is located within a range of the designed location, which is close enough such that the location platform server 34 notifies the application 50. For example, if the estimated travel time is short, such as ten minutes or less, the location platform server 34 may then inform the application 50 that the mobile station 14 is approximately located, or will soon be located, at the designated location. If the estimated travel time is more than ten minutes, a predetermined floor threshold amount of time, then the location platform server 34 will compute a next time to determine an updated location of the mobile station.

The location platform server 34 may also make a comparison in part by estimating a distance between the mobile station's current location and the designated location. In one example, the location platform server 34 will determine the current location of the mobile station and calculate the distance between the current location and the designated location. The location platform server 34 could do so by computing the Euclidian distance between location coordinates (e.g., latitude and longitude) of the current location and location coordinates of the designated location. The location platform server 34 may also query a geoserver to determine the distance between the current location and the designated location. In this manner, the location platform 34 will send the current location and the designated location to the geoserver, which may then calculate an estimated distance between the two locations.

The location platform server 34 will receive the estimated travel distance from the geoserver (or calculate the travel distance itself) and then determine if the mobile station is located within a range of the designed location, which is close enough such that the location platform server 34 notifies the application 50. For example, if the estimated travel distance is short, such as five miles or less, the location platform server 34 may then inform the application 50 that the mobile station 14 is approximately located, or will soon be located, at the designated location. If the estimated travel distance is more than five miles, a predetermined floor threshold distance, then the location platform server 34 could compute a next time to determine an updated location of the mobile station.

Computing a Next Time to Determine an Updated Location of the Mobile Station

In the exemplary embodiment, the location platform server 34 will compute the next time to determine the updated location of the mobile station, as shown by message 114 in FIG. 4, by calculating a percentage of the estimated travel time. For example, if the estimated travel time is thirty minutes, the location platform server 34 may calculate the next time to poll by taking 75% of the estimated travel time, i.e., twenty-two and a half minutes. The location platform server 34 then queries the MPC 36 to determine an updated location of the mobile station 14 once the next time expires. In this example, the location platform server 34 would query the MPC 36 to determine an updated location of the mobile station 14 after twenty-two and a half minutes. The percentage of the travel time used to calculate the next polling time may be any desired amount. However, if the estimated travel time for the mobile station 14 to travel from its current location to the designated location is one hour, for example, there is no need to poll the mobile station 14 again in ten minutes to determine if the mobile station 14 is at or near the designated location. It would be more efficient to poll again after thirty to forty minutes, for example. Therefore, in practice it may be more efficient to calculate the next polling time using at least 50% of the estimated travel time.

Using a predetermined percentage, such as 75%, of the travel time to compute the next time to poll provides for polling the mobile station's location more often as the mobile station 14 gets closer to the designated location. In the example above, for instance, after waiting twenty-two and a half minutes, the location platform server 34 will query to determine the updated location of the mobile station. Suppose after this query, now that the estimated travel time is ten minutes. Then the location platform server 34 will calculate the next time to determine an updated location of the mobile station by taking 75% of ten minutes, or seven and a half minutes. Therefore, the location platform server 34 will now query to determine an updated location of the mobile station in approximately seven and a half minutes. The location platform server 34 will continue polling the mobile station until the estimated travel time is less than a predetermined amount, such as five minutes for example.

In an alternate embodiment, the location platform server 34 will compute the next time to determine the updated location of the mobile station by calculating a percentage of an estimated travel time that it would take for the mobile station 14 to travel the distance between its current location and the designated location. For example, if the estimated travel distance is twenty miles, the location platform server 34 may calculate the next time to poll by taking 75% of an estimated travel time to travel twenty miles, which using a half hour to travel twenty miles would be twenty-two and a half minutes. The location platform server 34 could have predefined travel times corresponding to predefined travel distances. The location platform server 34 could then use the estimated travel distance to select a predefined travel time to calculate the next time to poll. In this manner, the location platform server 34 may not need to query a geoserver, since the location platform server 34 may be able to calculate the estimated travel distance and then could use a predefined travel time corresponding to this distance to calculate the next time to poll. The location platform server 34 then queries the MPC 36 to determine an updated location of the mobile station 14 once the next time expires. In this example, the location platform server 34 would query the MPC 36 to determine an updated location of the mobile station 14 after twenty-two and a half minutes. As above, the percentage of the travel time used to calculate the next polling time may be any desired amount.

In another embodiment, if the estimated travel time or estimated travel distance is more or less than a threshold amount, then the location platform server 34 may poll the MPC 36 again at a predetermined time interval. For example, if the estimated travel time is two hours or more, the location platform server 34 may simply poll again to determine the updated location of the mobile station 14 in one hour. Further, the location platform server 34 could programmatically stop polling the mobile station's location once a determination is made that the remaining travel time is less than a predetermined floor. For example, once the estimated travel time is determined to be five minutes or less, the location platform server 34 will then notify the application 50, as shown by message 116 in FIG. 4.

As another example, instead of using a percentage of the travel time, the location platform server 34 could have preset throttling intervals to apply depending on the estimated travel time or estimated travel distance. For instance, if the travel time is over a first threshold, the location platform server 34 may programmatically apply an interval of A minutes, if the travel time is between a second threshold and the first threshold, the location platform server 34 may apply an interval of B minutes, and if the travel time is lower than the second threshold, the location platform server 34 may apply an interval of C minutes. (Values A, B and C could be single values, or they could be acceptable ranges.) Other examples are possible as well.

When computing the next time to poll, the location platform server 34 may compute a time period and plan to determine the updated location of the mobile station once the time period expires, or the location platform server 34 may compute a time of day and plan to determine the updated location of the mobile station at the time of day. For example, the location platform server 34 may compute the polling interval to be ten minutes. The location platform server 34 could then compute the time of day to poll again, which would be ten minutes from the current time.

While exemplary embodiments have been described, persons of skill in the art will appreciate that variations may be made without departure from the scope and spirit of the invention. This true scope and spirit is defined by the appended claims, which may be interpreted in light of the foregoing.

What is claimed is:

1. A method comprising:

determining a current location of a mobile station;

making a comparison of the current location to a designated location;

based on the comparison, computing a next time to determine an updated location of the mobile station; and sending content associated with the designated location to the mobile station once the mobile station is located within a range of the designated location, wherein making the comparison comprises estimating a distance between the current location and the designated location, wherein computing the next time to determine the updated location of the mobile station comprises estimating a time interval to travel the distance between the current location and the designated location, wherein estimating the time interval to travel the distance between the current location and the designated location comprises using a predefined travel time that corresponds to traveling the distance between the current location and the designated location, and wherein computing the next time to determine the updated location of the mobile station comprises calculating a percentage of the predefined travel time, wherein the next time to determine the updated location of the mobile station is at least about 50% of the predefined travel time.

2. The method of claim 1, wherein the determining, making and computing functions are carried out by a network server, and wherein determining the current location of the mobile station comprises receiving from a location determination system an indication of the current location of the mobile station.

3. The method of claim 1, wherein the determining, making and computing functions are carried out by the mobile station, and wherein determining the current location of the mobile station comprises:

sending a position determination request into a network; and receiving from the network an indication of the current location of the mobile station.

4. The method of claim 1, further comprising repeating the steps of claim 1 until the mobile station is located within the range of the designated location.

5. The method of claim 4, wherein the range is a distance.

6. The method of claim 4, wherein the range is an amount of time to travel from the current location to the designated location.

7. The method of claim 1, further comprising repeating the steps of claim 1 until the mobile station is located at the designated location.

8. The method of claim 7, further comprising once the next time is less than a threshold, stop repeating the steps of claim 1.

9. A system comprising:

a content serving element that stores content associated with a designated location and sends the content to a mobile station when the mobile station is located within a range of the designated location; and a location determining element arranged to:

(a) determine when the mobile station is located within the range; and (b) responsively inform the content serving element when the mobile station is located within the range, wherein the location determining element determines when the mobile station is located within the range by performing a process comprising:

(i) determining a current location of the mobile station, and (ii) if the current location is not within the range, computing a next time to determine an updated location of the mobile station by estimating a travel time required for the mobile station to travel from the current location to the designated location using at least about 50% of a predefined travel time and at the next time, repeating from step (i).

10. The system of claim 9, wherein the location determining element estimates the travel time by:

requesting the travel time from a geoserver; and receiving the travel time from the geoserver.

11. The system of claim 10 wherein requesting the travel time from the geoserver comprises sending information indicative of the current location and the designated location to the geoserver.

12. The system of claim 9, wherein the content serving element includes a plurality of content, where each content is associated with a respective designated location, and wherein given content is sent to the mobile station once the mobile station is approximately located at the respective designated location of the given content.

13. The system of claim 9, wherein the content is selected from the group consisting of advertisements, solicitations, and coupons.

14. The system of claim 9, wherein the content is sent to the mobile station through short message service (SMS) messaging.

15. The system of claim 9, wherein the content is sent to the mobile station through wireless application protocol (WAP) push messaging.

* * * * *